(12) United States Patent
Kaku

(10) Patent No.: US 12,279,074 B2
(45) Date of Patent: Apr. 15, 2025

(54) INFORMATION PROCESSING METHOD, INFORMATION PROCESSING APPARATUS, AND NON-TRANSITORY COMPUTER READABLE MEDIUM

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 18/162,258

(22) Filed: Jan. 31, 2023

(65) Prior Publication Data

US 2023/0247179 A1 Aug. 3, 2023

(30) Foreign Application Priority Data

Feb. 2, 2022 (JP) .................. 2022-015238

(51) Int. Cl.
*H04N 7/15* (2006.01)
*G06T 17/00* (2006.01)
*G06V 10/74* (2022.01)

(52) U.S. Cl.
CPC ............. *H04N 7/157* (2013.01); *G06T 17/00* (2013.01); *G06V 10/761* (2022.01)

(58) Field of Classification Search
CPC ....... H04N 7/157; G06V 10/761; G06T 17/00
See application file for complete search history.

(56) References Cited

U.S. PATENT DOCUMENTS

2018/0205888 A1* 7/2018 Tsukahara ................ H04N 7/15
2020/0151427 A1* 5/2020 Kimura .................. G06V 40/18

FOREIGN PATENT DOCUMENTS

| JP | 2011-166316 A | 8/2011 |
| JP | 2011-249896 A | 12/2011 |
| JP | 2017-062598 A | 3/2017 |
| WO | 2018/225518 A1 | 12/2018 |

* cited by examiner

*Primary Examiner* — Amal S Zenati
(74) *Attorney, Agent, or Firm* — Sughrue Mion, PLLC (57) ABSTRACT

In second virtual space, a second user is positioned at the same distance from a second virtual camera as a physical distance from a first user to a first display in real space, and is rendered by the second virtual camera. In first virtual space, the first user is positioned at the same distance from a first virtual camera as a physical distance from the second user to a second display in real space, and is rendered by the first virtual camera.

7 Claims, 9 Drawing Sheets

| CONVERSATION ID | FIRST OBJECT IMAGE | SECOND OBJECT IMAGE |
|---|---|---|
| T01 | M01 | M02 |
| ⋮ | ⋮ | ⋮ |

INFORMATION PROCESSING METHOD, INFORMATION PROCESSING APPARATUS, AND NON-TRANSITORY COMPUTER READABLE MEDIUM

CROSS-REFERENCE TO RELATED APPLICATION

This application claims priority to Japanese Patent Application No. 2022-015238, filed on Feb. 2, 2022, the entire contents of which are incorporated herein by reference.

TECHNICAL FIELD

The present disclosure relates to an information processing method, an information processing apparatus, and a program.

BACKGROUND

There is known a remote face-to-face communication apparatus that captures a first video of a subject who is looking at a screen of a display device, which displays a video, from its front using a visible light video camera from the side of the display device, captures a distance video indicating a distance to the subject using a distance camera, and generates, from the first video captured by the visible light video camera, a second video captured from a position different from the position of the visible light video camera, using the distance video captured by the distance camera (for example, Patent Literature (PTL) 1).

CITATION LIST

Patent Literature

PTL 1: JP 2011-166316 A

SUMMARY

In a video conference as in the technology described above, a distance to an interlocutor is sometimes far due to visibility of a sensor. In this case, a conversation with eye contact cannot be held.

It would be helpful to provide an information processing method, an information processing apparatus, and a program that can provide a video call that enables a conversation with eye contact.

An information processing method according to an embodiment of the present disclosure is an information processing method performed by an information processing apparatus capable of communicating with a first user terminal and a second user terminal,
  the first user terminal including a first display at which a first user looks,
  the second user terminal including a second display at which a second user looks,
  the information processing method including:
  generating a first object image corresponding to the first user imaged by a first virtual camera installed in first virtual space;
  generating a second object image corresponding to the second user imaged by a second virtual camera installed in second virtual space;
  transmitting the first object image to the second user terminal; and
  transmitting the second object image to the first user terminal,
  wherein
  in the second virtual space, the second user is positioned at the same distance from the second virtual camera as a physical distance from the first user to the first display in real space, and is rendered by the second virtual camera, and
  in the first virtual space, the first user is positioned at the same distance from the first virtual camera as a physical distance from the second user to the second display in real space, and is rendered by the first virtual camera.

An information processing apparatus according to an embodiment of the present disclosure is an information processing apparatus capable of communicating with a first user terminal and a second user terminal, the information processing apparatus including a controller,
  the first user terminal including a first display at which a first user looks,
  the second user terminal including a second display at which a second user looks,
  the controller configured to:
  generate a first object image corresponding to the first user imaged by a first virtual camera installed in first virtual space;
  generate a second object image corresponding to the second user imaged by a second virtual camera installed in second virtual space;
  transmit the first object image to the second user terminal; and
  transmit the second object image to the first user terminal,
  wherein
  in the second virtual space, the second user is positioned at the same distance from the second virtual camera as a physical distance from the first user to the first display in real space, and is rendered by the second virtual camera, and
  in the first virtual space, the first user is positioned at the same distance from the first virtual camera as a physical distance from the second user to the second display in real space, and is rendered by the first virtual camera.

A program according to an embodiment of the present disclosure is a program configured to cause a computer, as an information processing apparatus capable of communicating with a first user terminal and a second user terminal, to execute operations,
  the first user terminal including a first display at which a first user looks,
  the second user terminal including a second display at which a second user looks,
  the operations including:
  generating a first object image corresponding to the first user imaged by a first virtual camera installed in first virtual space;
  generating a second object image corresponding to the second user imaged by a second virtual camera installed in second virtual space;
  transmitting the first object image to the second user terminal; and
  transmitting the second object image to the first user terminal,
  wherein
  in the second virtual space, the second user is positioned at the same distance from the second virtual camera as a physical distance from the first user to the first display in real space, and is rendered by the second virtual camera, and in the first virtual space, the first user is positioned at the same distance from the first virtual camera as a physical distance from the second user to the second display in real space, and is rendered by the first virtual camera.

According to an information processing method, an information processing apparatus, and a program of an embodiment of the present disclosure, a video call that enables a conversation with eye contact can be provided.

DETAILED DESCRIPTION

Figure 1:
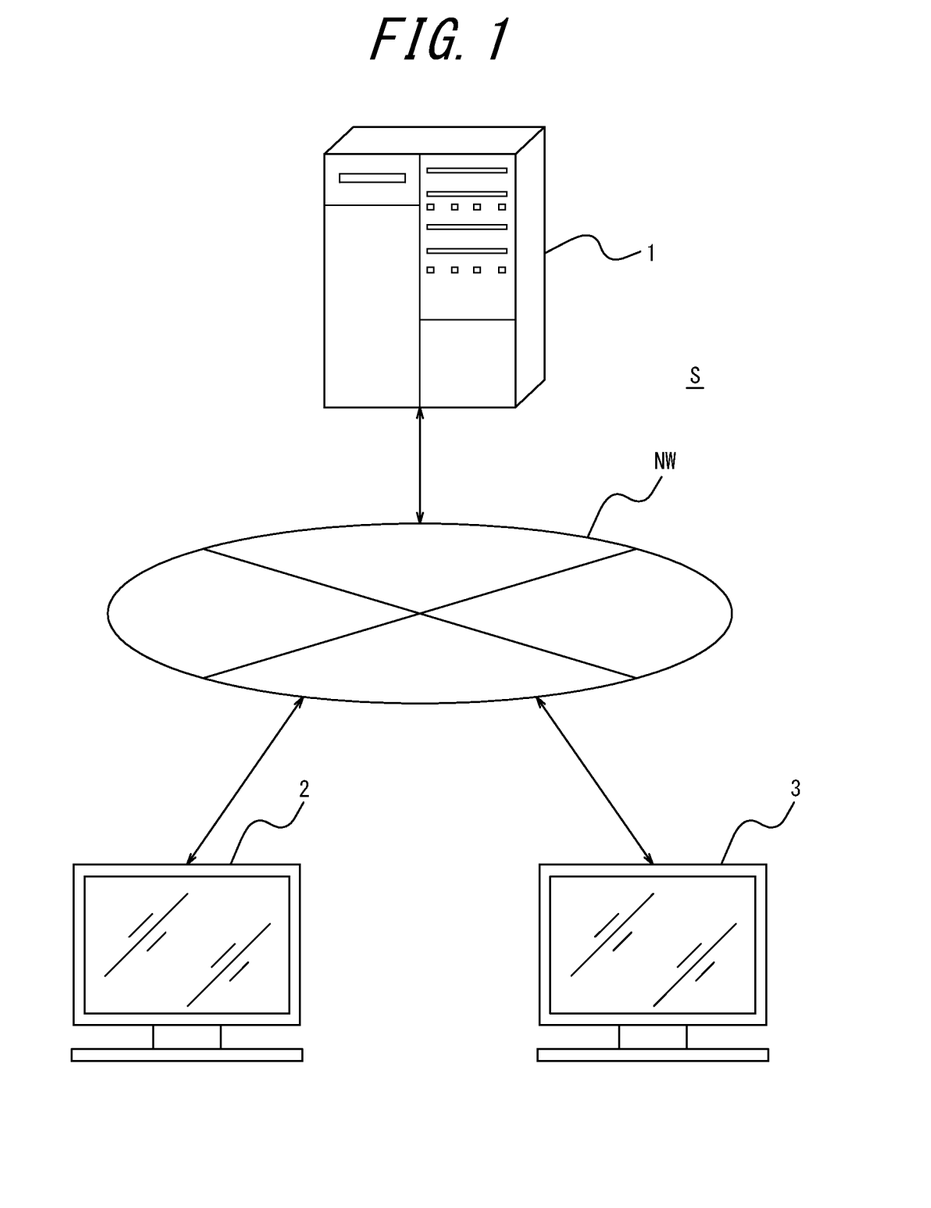
FIG. 1 is a schematic diagram of an information processing system.

FIG. 1 is a schematic diagram of an information processing system S according to the present embodiment. The information processing system S includes an information processing apparatus 1, a first user terminal 2, and a second user terminal 3, which are communicably connected to each other via a network NW. The network NW includes, for example, a mobile communication network or the Internet.

FIG. 1 illustrates one of the information processing apparatus 1, one of the first user terminal 2, and one of the second user terminal 3, for convenience of explanation. However, the number of information processing apparatuses 1, the number of first user terminals 2, and the number of second user terminals 3 are not limited to one. For example, processing to be executed by the information processing apparatus 1 according to the present embodiment may be executed by a plurality of distributed information processing apparatuses 1.

The information processing apparatus 1 is installed in a facility such as a data center. The information processing apparatus 1 is a computer such as a server that belongs to a cloud computing system or another type of computing system.

Figure 2:
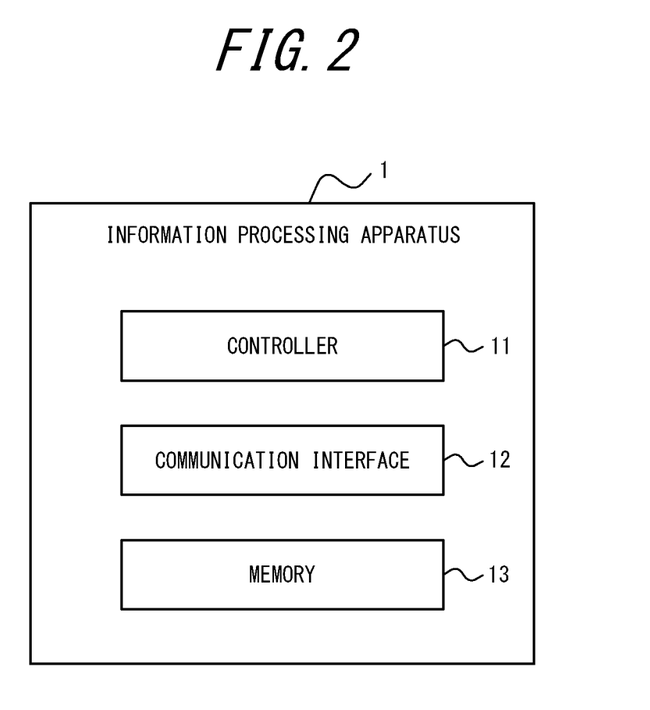
FIG. 2 is a block diagram illustrating a configuration of an information processing apparatus.

With reference to FIG. 2, an internal configuration of the information processing apparatus 1 will be described in detail.

The information processing apparatus 1 includes a controller 11, a communication interface 12, and a memory 13. The components of the information processing apparatus 1 are communicably connected to one another via, for example, dedicated lines.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of the dedicated circuits may include a Field-Programmable Gate Array (FPGA) and an Application Specific Integrated Circuit (ASIC). The controller 11 may include an Electronic Control Unit (ECU). The controller 11 transmits and receives any information via the communication interface 12.

The communication interface 12 includes one or more communication modules for connection to the network NW that conform to wired or wireless Local Area Network (LAN) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 transmits and receives any information via the network NW.

The memory 13 includes, for example, a semiconductor memory, a magnetic memory, an optical memory, or a combination of at least two of these, but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The memory 13 may store various types of information or the like regarding operations and control of the information processing apparatus 1. The memory 13 may store a system program, an application program, embedded software, and the like. The memory 13 may be provided outside the information processing apparatus 1 and accessed by the information processing apparatus 1. The memory 13 includes a conversation DB, which will be described later.

The first user terminal 2 is a terminal to be operated by a user. The first user terminal 2 may be, for example, a general purpose device such as a PC, or a dedicated device. The term "PC" is an abbreviation of personal computer. As an alternative example, the first user terminal 2 may be a mobile device such as a mobile phone, a smartphone, a wearable device, or a tablet.

Figure 3:
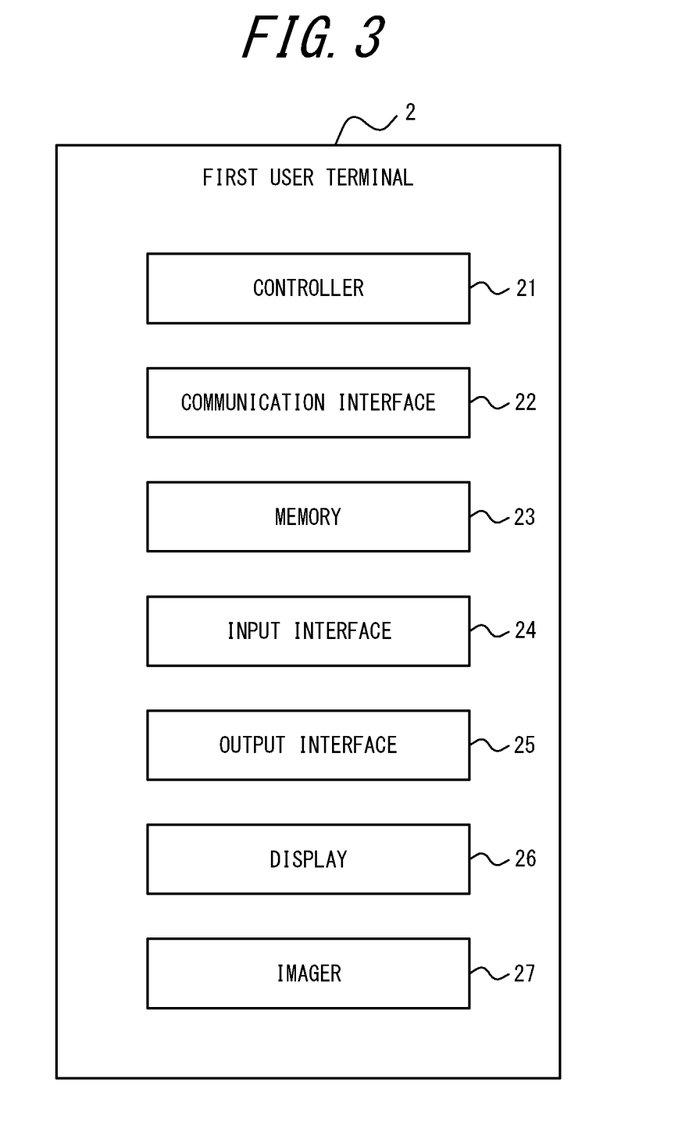
FIG. 3 is a block diagram illustrating a configuration of a first user terminal.

With reference to FIG. 3, an internal configuration of the first user terminal 2 will be described in detail.

The first user terminal 2 includes a controller 21, a communication interface 22, a memory 23, an input interface 24, an output interface 25, a display 26, and an imager 27. The components of the first user terminal 2 are communicably connected to one another, for example, via dedicated lines.

The hardware configurations of the controller 21, communication interface 22, and memory 23 of the first user terminal 2 may be the same as those of the controller 11, communication interface 12, and memory 13 of the information processing apparatus 1, respectively. An explanation here is omitted.

The input interface 24 is, for example, a microphone, a physical key, a capacitive key, a pointing device, or a touch screen integrally provided with a display. The input interface 24 accepts an operation for inputting information to be used for the operations of the first user terminal 2. The input interface 24, instead of being included in the first user terminal 2, may be connected to the first user terminal 2 as an external input device. As the connection method, any technology such as, for example, USB, HDMI® (HDMI is a registered trademark in Japan, other countries, or both), or Bluetooth® can be used.

The output interface 25 includes at least one interface for outputting information to notify the user of the information. For example, the interface included in the output interface 25 is a speaker for outputting the information in the form of audio, or the like, but is not limited to this.

The display 26 is, for example, a display. The display is, for example, an LCD or an organic EL display. The term "LCD" is an abbreviation of liquid crystal display. The term "EL" is an abbreviation of electro luminescence. The display 26, instead of being included in the first user terminal 2, may be connected to the first user terminal 2 as an external output device. As the connection method, any technology such as, for example, USB, HDMI®, or Bluetooth® can be used. The term "USB" is an abbreviation of Universal Serial Bus. The term "HDMI®" is an abbreviation of High-Definition Multimedia Interface. The display 26 may include, for example, a Light Field Display (LFD).

The imager 27 includes a camera and is configured to capture images. For example, the imager 27 may include two cameras for 3D holograms and one camera for tracking eye positions. The images may be either still images or moving images. The imager 27 may generate images and record the generated images in the memory 13.

The second user terminal 3 is a terminal to be operated by a user. The second user terminal 3 may be, for example, a general purpose device such as a PC, or a dedicated device. The term "PC" is an abbreviation of personal computer. As an alternative example, the second user terminal 3 may be a mobile device such as a mobile phone, a smartphone, a wearable device, or a tablet.

Figure 4:
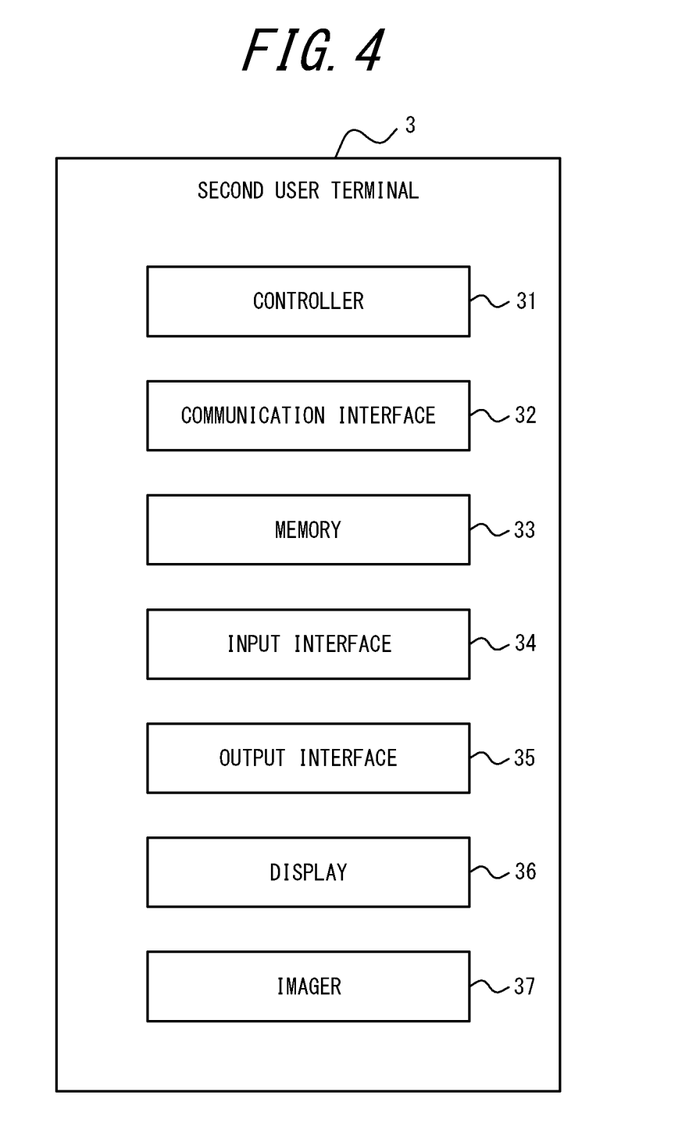
FIG. 4 is a block diagram illustrating a configuration of a second user terminal.

With reference to FIG. 4, an internal configuration of the second user terminal 3 will be described in detail.

The second user terminal 3 includes a controller 31, a communication interface 32, a memory 33, an input interface 34, an output interface 35, a display 36, and an imager 37. The components of the second user terminal 3 are communicably connected to one another, for example, via dedicated lines.

The hardware configurations of the controller 31, communication interface 32, memory 33, input interface 34, output interface 35, display 36, and imager 37 of the second user terminal 3 may be the same as those of the controller 21, communication interface 22, memory 23, input interface 24, output interface 25, display 26, and imager 27 of the first user terminal 2, respectively. An explanation here is omitted.

Hereinafter, processing executed in the information processing system S according to the present embodiment will be described. Here, a first user operating the first user terminal 2 and a second user operating the second user terminal 3 make a video call. The first user looks at the display 26 (also referred to as first display) of the first user terminal 2. The second user looks at the display 36 (also referred to as second display) of the second user terminal 3. The controller 21 of the first user terminal 2 controls the imager 27 to capture an image of the first user, and controls a microphone of the input interface 24 to acquire audio of the first user. The controller 21 transmits the image and audio of the first user to the information processing apparatus 1. The controller 11 of the information processing apparatus 1 generates a first object image from the acquired image. Details of generation processing will be described below. The controller 11 transmits the first object image and the audio to the second user terminal 3. The second user terminal 3 displays the acquired first object image on the display 36 and outputs the acquired audio from a speaker of the output interface 35.

The second user looks at the first object image of the first user and listens to the audio of the first user, and responds to the first user. The controller 31 of the second user terminal 3 controls the imager 37 to capture an image of the second user, and controls a microphone of the input interface 34 to acquire audio of the second user. The controller 31 transmits the image and audio of the second user to the information processing apparatus 1. The controller 11 of the information processing apparatus 1 generates a second object image from the image of the second user. Processing to be performed by the controller 11 of the information processing apparatus 1 on the image and audio of the second user may be the same as the processing performed by the controller 11 of the information processing apparatus 1 on the image and audio of the first user. An explanation here is omitted.

Figure 5:
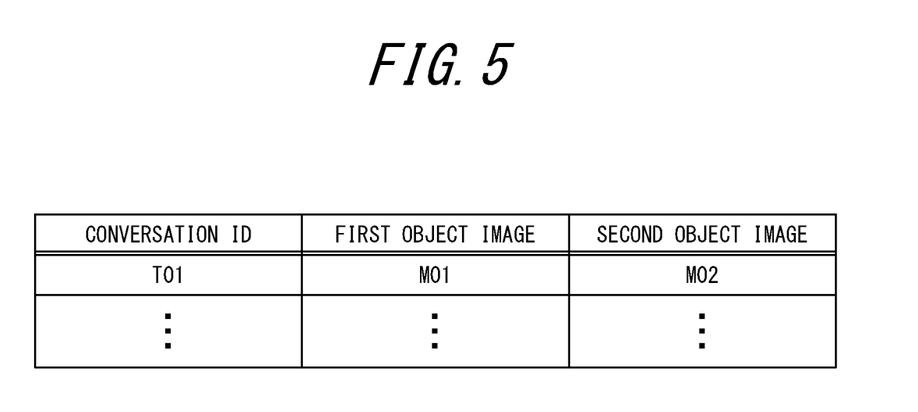
FIG. 5 is a diagram illustrating a data structure of a conversation database (DB)

As illustrated in FIG. 5, the controller 11 stores a first object image M01 and a second object image M02 in the memory 13 in association with a conversation ID.

The generation processing of the first and second object images will be described in detail.

The controller 11 may generate the first and second object images using, for example, 3D computer graphics technology. The first and second object images are each an image with a sense of depth (stereoscopic effect) generated by converting a virtual stereoscopic object in three-dimensional space into information on a two-dimensional plane. Any method can be applied to at least one of modeling, scene layout settings, rendering, or retouching to be performed in a generation process.

Figure 6:
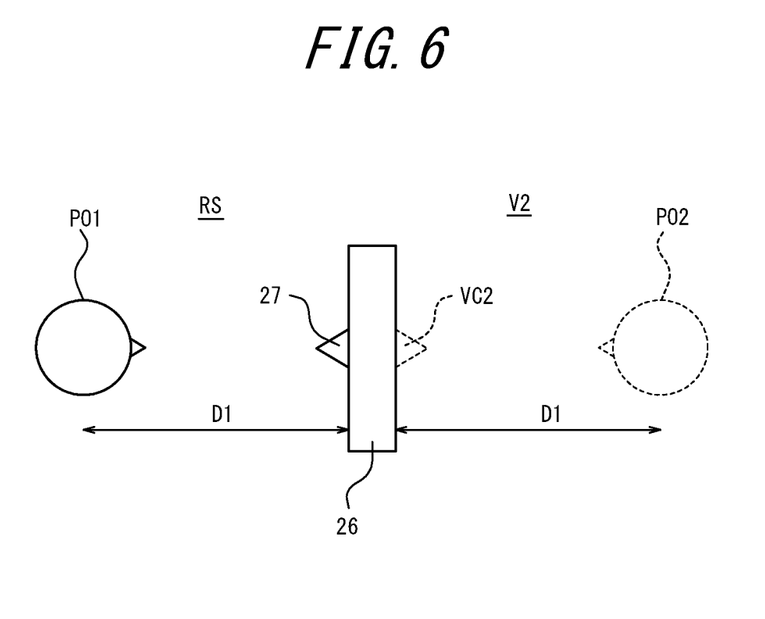
FIG. 6 is a diagram illustrating a conversation on the side of a first user.

As illustrated in FIG. 6, in real space RS, a first user P01 speaks to the display 26 and imager 27 of the first user terminal 2. Assuming that D1 is a physical distance from the first user P01 to the display 26. On the display 26, second virtual space V2 is displayed. A second virtual camera VC2 is installed in the second virtual space V2. A second object image of the second user P02 is displayed in the second virtual space V2.

In generating the second object image, the controller 11 of the information processing apparatus 1 generates the second object image such that the second user P02 looks straight at the second virtual camera VC2. In the second virtual space V2, the second user P02 is positioned at the same distance from the second virtual camera VC2 as the physical distance D1 from the first user P01 to the display 26 in the real space RS, and is rendered by the second virtual camera VC2. The first user P01 can thereby hold a conversation with the second user P02 through the display 26, while making eye contact.

Figure 7:
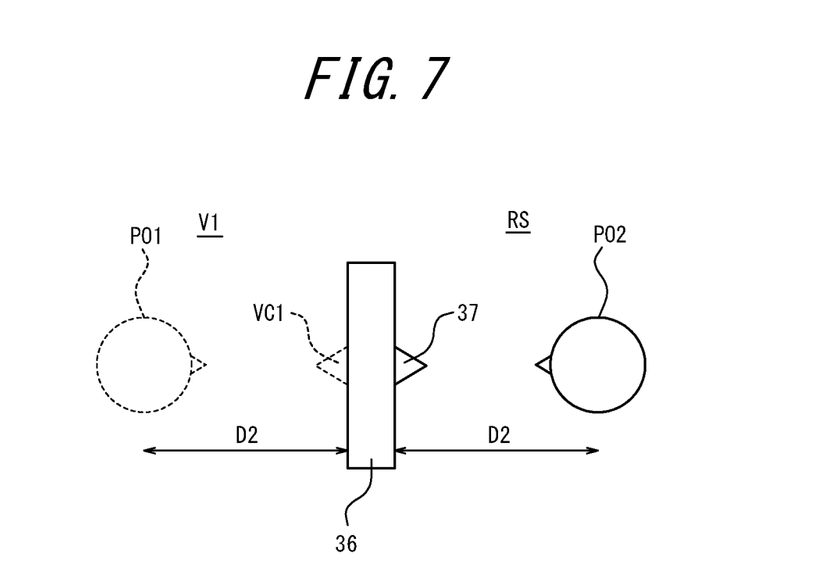
FIG. 7 is a diagram illustrating a conversation on the side of a second user.

Similarly, as illustrated in FIG. 7, in real space RS, the second user P02 speaks to the display 36 and imager 37 of the second user terminal 3. Assuming that D2 is a physical distance from the second user P02 to the display 36. On the display 36, first virtual space V1 is displayed. A first object image of the first user P01 is displayed in the first virtual space V1.

In generating the first object image, the controller 11 of the information processing apparatus 1 generates the first object image such that the first user P01 looks straight at the first virtual camera VC1. In the first virtual space V1, the first user P01 is positioned at the same distance from the first virtual camera VC1 as the physical distance D2 from the second user P02 to the display 36 in the real space RS, and is rendered by the first virtual camera VC1. The second user P02 can thereby hold a conversation with the first user P01 through the display 36, while making eye contact.

In FIG. 6, the first user P01 who is in conversation may move closer to or away from the display 26. Alternatively, the first user P01 may shift left or right. Here, as an example, processing when the first user P01 moves closer to the display 26 will be described. An explanation overlapping with that of the generation method described in FIG. 6 is omitted.

Figure 8:
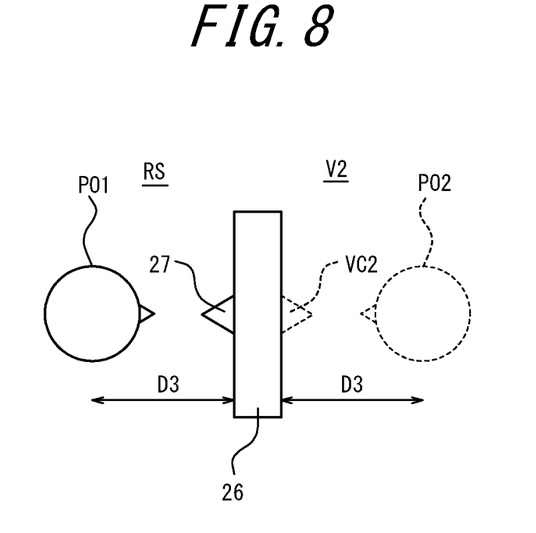
FIG. 8 is a diagram illustrating a conversation when the first user has moved, in the conversation illustrated in FIG. 6.

As illustrated in FIG. 8, the first user P01 moves closer to the display 26. A distance from the first user P01 to the display 26 at this time is D3. The controller 11 of the information processing apparatus 1 generates a second object image such that a distance from the second virtual camera VC2 to the second user P02 is D3. The first user P01 can thereby hold a conversation with the second user P02 through the display 26, while making eye contact.

Figure 9:
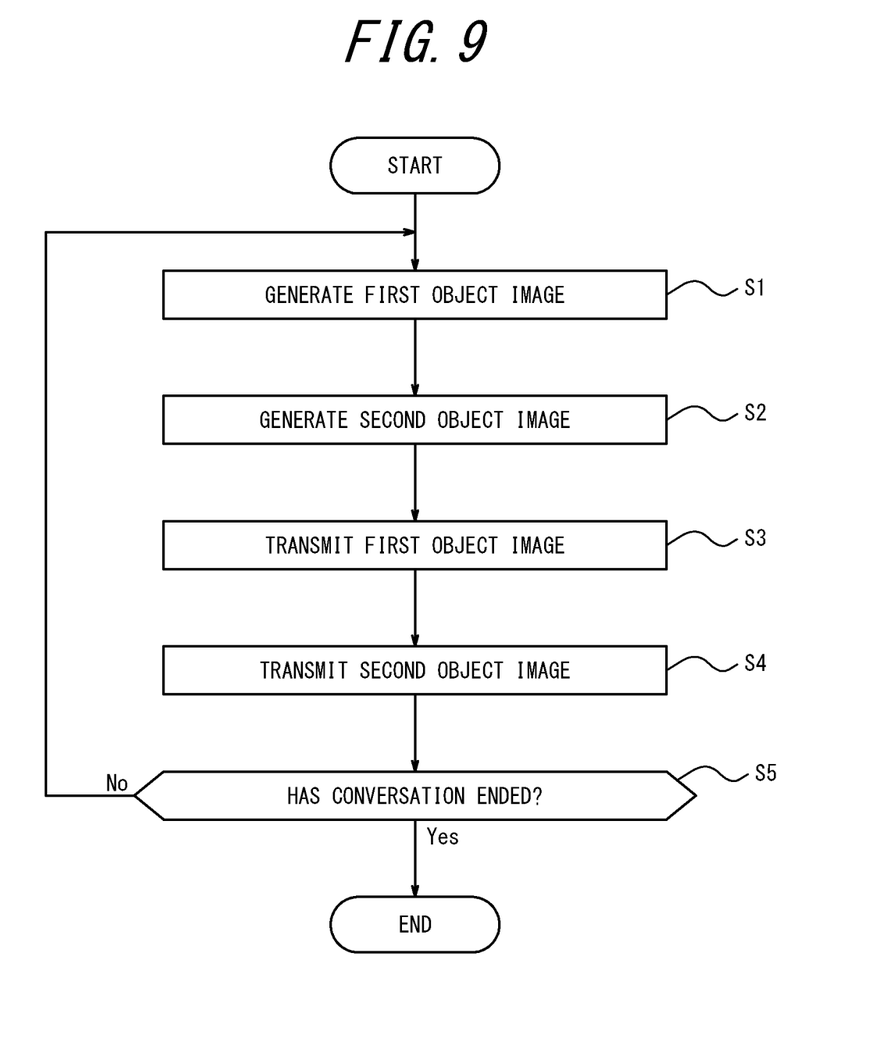
FIG. 9 is a flowchart illustrating operations of the information processing apparatus.

An information processing method performed by the controller 11 of the information processing apparatus 1 will be described with reference to FIG. 9. Information processing is performed as often as necessary to enable a smooth conversation via the first user terminal 2 and the second user terminal 3.

In step S1, upon acquiring a captured image from the first user terminal 2, the controller 11 generates a first object image.

In step S2, upon acquiring a captured image from the second user terminal 3, the controller 11 generates a second object image.

In step S3, the controller 11 transmits the first object image to the second user terminal 3. Step S3 may be performed at any time after step S1. The first object image is displayed on the second user terminal 3.

In step S4, the controller 11 transmits the second object image to the first user terminal 2. Step S4 may be performed at any time after step S2. The second object image is displayed on the first user terminal 2.

In step S5, the controller 11 determines whether a conversation between the first user terminal 2 and the second user terminal 3 has ended.

When Yes in step S5, the controller 11 ends the flow.

When No in step S5, the controller 11 returns to step S1.

As described above, according to the present embodiment, in the second virtual space V2, the second user P02 is positioned at the same distance from the second virtual camera VC2 as the physical distance from the first user P01 to the display 26 in the real space, and is rendered by the second virtual camera VC2. In the first virtual space V1, the first user P01 is positioned at the same distance from the first virtual camera VC1 as the physical distance from the second user P02 to the display 36 in the real space, and is rendered by the first virtual camera VC1. This configuration allows the first user P01 and the second user P02 to hold a conversation with eye contact in a video call. The same is true when the first user P01 or the second user P02 moves closer to or away from the display during a conversation.

According to the present embodiment, the display 26 and the display 36 each include a light field display. Light field displays can produce images only in a horizontal direction, and hence have the problem that the reproducibility of an object is improved only in part (contour) corresponding to a section when the object is cut by a display surface (tangent surface). Application of the present embodiment to the light field displays improves the reproducibility of the object in parts other than the section.

For example, in the aforementioned embodiment, a program configured to execute all or some of the functions or processing of the information processing apparatus 1 can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may be provided as a program product. The present disclosure can also be implemented as a program executable by a processor.

The computer temporarily stores in a main memory, for example, a program recorded on a portable recording medium, or a program transferred from the server. Then, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

The invention claimed is:

1. An information processing method performed by an information processing apparatus capable of communicating with a first user terminal and a second user terminal,
the first user terminal including a first display at which a first user looks,
the second user terminal including a second display at which a second user looks,
the information processing method comprising:
generating a first object image corresponding to the first user imaged by a first virtual camera installed in first virtual space;
generating a second object image corresponding to the second user imaged by a second virtual camera installed in second virtual space;
transmitting the first object image to the second user terminal; and
transmitting the second object image to the first user terminal,
wherein in the generating and transmitting the first object image, in the second virtual space, the second user is positioned at a second virtual distance from the second virtual camera at a distance equal to a first physical distance between the first user and the first display in real space, and is rendered by the second virtual camera, and wherein in the generating and transmitting the second object image, in the first virtual space, the first user is positioned at a first virtual distance from the first virtual camera at a distance equal to a second physical distance between the second user and the second display in real space, and is rendered by the first virtual camera.

2. The information processing method according to claim 1, wherein each of the first display and the second display includes a light field display.

3. The information processing method according to claim 1, further comprising:

in a state in which the first user moves closer or farther away from the first display by a third physical distance, in the generating and transmitting the first object image, in the second virtual space, the second user is positioned at a third virtual distance from the second virtual camera at a distance equal to the third physical distance between the first user and the first display in real space, and is rendered by the second virtual camera, and in a state in which the second user moves closer or farther away from the first display by a fourth physical distance, in the generating and transmitting the second object image, in the first virtual space, the first user is positioned at a fourth virtual distance from the first virtual camera at a distance equal to the fourth physical distance between the second user and the second display in real space, and is rendered by the first virtual camera.

4. An information processing apparatus capable of communicating with a first user terminal and a second user terminal, the information processing apparatus comprising a controller, the first user terminal including a first display at which a first user looks, the second user terminal including a second display at which a second user looks, the controller configured to:

generate a first object image corresponding to the first user imaged by a first virtual camera installed in first virtual space;

generate a second object image corresponding to the second user imaged by a second virtual camera installed in second virtual space;

transmit the first object image to the second user terminal; and transmit the second object image to the first user terminal, wherein in the second virtual space, the controller is configured to position the second user at a second virtual distance from the second virtual camera at a distance equal to a first physical distance between the first user and the first display in real space, and is rendered by the second virtual camera, and wherein in the first virtual space, the controller is configured to position the first user at a first virtual distance from the first virtual camera at a distance equal to a second physical distance between the second user and the second display in real space, and is rendered by the first virtual camera.

5. The information processing apparatus according to claim 4, wherein the controller is further configured to:

in a state in which the first user moves closer or farther away from the first display by a third physical distance, in the second virtual space, position the second user at a third virtual distance from the second virtual camera at a distance equal to the third physical distance between the first user and the first display in real space, and is rendered by the second virtual camera, and in a state in which the second user moves closer or farther away from the first display by a fourth physical distance, in the first virtual space, position the first user at a fourth virtual distance from the first virtual camera at a distance equal to the fourth physical distance between the second user and the second display in real space, and is rendered by the first virtual camera.

6. A non-transitory computer readable medium storing a program configured to cause a computer, as an information processing apparatus capable of communicating with a first user terminal and a second user terminal, to execute operations, the first user terminal including a first display at which a first user looks, the second user terminal including a second display at which a second user looks, the operations comprising:

generating a first object image corresponding to the first user imaged by a first virtual camera installed in first virtual space;

generating a second object image corresponding to the second user imaged by a second virtual camera installed in second virtual space;

transmitting the first object image to the second user terminal; and transmitting the second object image to the first user terminal, wherein in the rating and transmitting the first object image in the second virtual space, the second user is positioned at a second virtual distance from the second virtual camera at a distance equal to a first physical distance between the first user and the first display in real space, and is rendered by the second virtual camera, and wherein in the generating and transmitting the second object image, in the first virtual space, the first user is positioned at a first virtual distance from the first virtual camera at a distance equal to a second physical distance between the second user and the second display in real space, and is rendered by the first virtual camera.

7. The non-transitory computer readable medium according to claim 6, further comprising:

in a state in which the first user moves closer or farther away from the first display by a third physical distance, in the generating and transmitting the first object image, in the second virtual space, the second user is positioned at a third virtual distance from the second virtual camera at a distance equal to the third physical distance between the first user and the first display in real space, and is rendered by the second virtual camera, and in a state in which the second user moves closer or farther away from the first display by a fourth physical distance, in the generating and transmitting the second object image, in the first virtual space, the first user is positioned at a fourth virtual distance from the first virtual camera at a distance equal to the fourth physical distance between the second user and the second display in real space, and is rendered by the first virtual camera.

* * * * *